United States Patent
Windorfer et al.

(10) Patent No.: US 10,827,552 B2
(45) Date of Patent: Nov. 3, 2020

(54) METHOD FOR CONNECTING A HOUSEHOLD APPLIANCE TO A WIRELESS HOME NETWORK

(71) Applicant: Vorwerk & Co. Interholding GmbH, Wuppertal (DE)

(72) Inventors: Harald Windorfer, Mettmann (DE); Lorenz Hillen, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 23 days.

(21) Appl. No.: 16/111,374

(22) Filed: Aug. 24, 2018

(65) Prior Publication Data

US 2019/0069334 A1 Feb. 28, 2019

(30) Foreign Application Priority Data

Aug. 25, 2017 (DE) .......................... 10 2017 119 589

(51) Int. Cl.
*H04W 76/18* (2018.01)
*A47L 9/28* (2006.01)
(Continued)

(52) U.S. Cl.
CPC ........... *H04W 76/18* (2018.02); *A47L 9/2857* (2013.01); *H04L 12/2803* (2013.01);
(Continued)

(58) Field of Classification Search
CPC ........... H04W 12/06; H04W 12/00516; H04W 12/003; H04W 84/12; H04W 76/18; H04L 2012/2841; H04L 63/18; H04L 63/083; H04L 12/2803; H04L 12/2821; A47L 9/2857; A47L 2201/00
(Continued)

(56) References Cited

U.S. PATENT DOCUMENTS

| | | | |
|---|---|---|---|
| 2014/0207282 A1* | 7/2014 | Angle | G05B 15/02 700/257 |
| 2015/0195414 A1* | 7/2015 | Raleigh | H04L 63/0428 370/252 |

(Continued)

FOREIGN PATENT DOCUMENTS

EP 2 728 938 A2 5/2014

*Primary Examiner* — Phong La
(74) *Attorney, Agent, or Firm* — Collard & Roe, P.C.

(57) ABSTRACT

A method for connecting a household appliance to a wireless home network, wherein a user terminal connects to a temporary communication network of the household appliance and transmits network access information for the home network to the household appliance, wherein the temporary communication network is ended subsequently and the household appliance logs into the wireless home network by using the received network access information, and wherein the user terminal obtains information from the household appliance about the fact that the log-in of the household appliance into the home network has failed. The household appliance opens a temporary communication network again if the log-in fails, wherein the user terminal recognizes the renewed opening of the temporary communication network and classifies it as information about the failure of the household appliance to log into the home network.

9 Claims, 2 Drawing Sheets

(51) Int. Cl.
*H04W 84/12* (2009.01)
*H04L 12/28* (2006.01)
*H04W 12/00* (2009.01)
*H04L 29/06* (2006.01)
*H04W 12/06* (2009.01)

(52) U.S. Cl.
CPC ....... *H04L 12/2821* (2013.01); *H04W 12/003* (2019.01); *H04W 84/12* (2013.01); *A47L 2201/00* (2013.01); *H04L 63/083* (2013.01); *H04L 63/18* (2013.01); *H04L 2012/2841* (2013.01); *H04W 12/00516* (2019.01); *H04W 12/06* (2013.01)

(58) Field of Classification Search
USPC ........................................................ 370/254
See application file for complete search history.

(56) References Cited

U.S. PATENT DOCUMENTS

| | | | | |
|---|---|---|---|---|
| 2015/0215832 | A1* | 7/2015 | Fitzpatrick | H04W 48/18 |
| | | | | 455/426.1 |
| 2016/0164725 | A1* | 6/2016 | Wu | H04L 12/40 |
| | | | | 713/168 |
| 2017/0006039 | A1* | 1/2017 | Ernohazy | H04L 63/102 |
| 2017/0289901 | A1* | 10/2017 | Kim | H04W 48/16 |
| 2017/0318462 | A1* | 11/2017 | Murdoch | H04L 63/083 |
| 2018/0176079 | A1* | 6/2018 | Teo | H04L 29/08 |
| 2018/0292827 | A1* | 10/2018 | Artes | B25J 9/1664 |
| 2018/0367843 | A1* | 12/2018 | Han | H04N 21/4131 |

\* cited by examiner

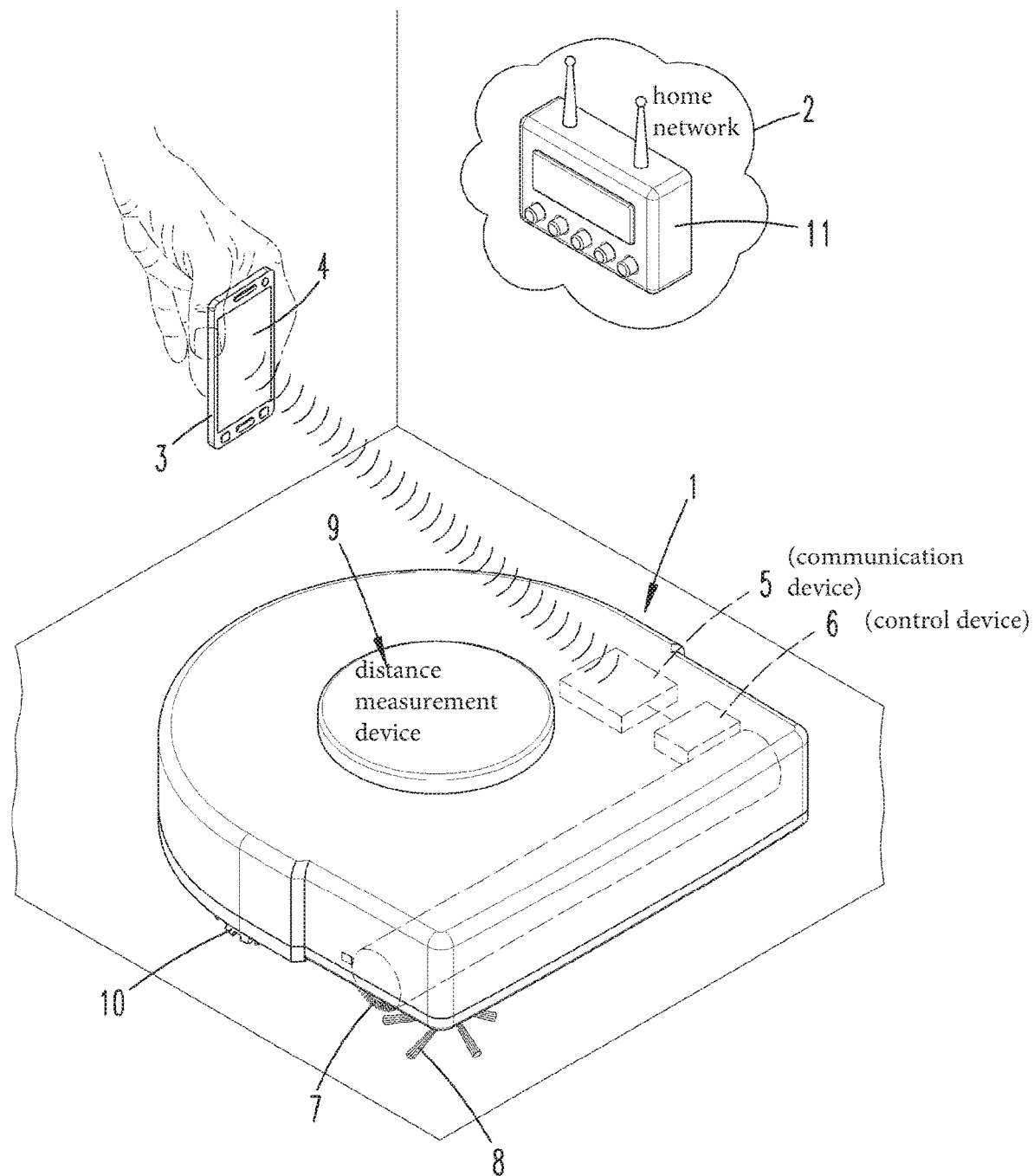

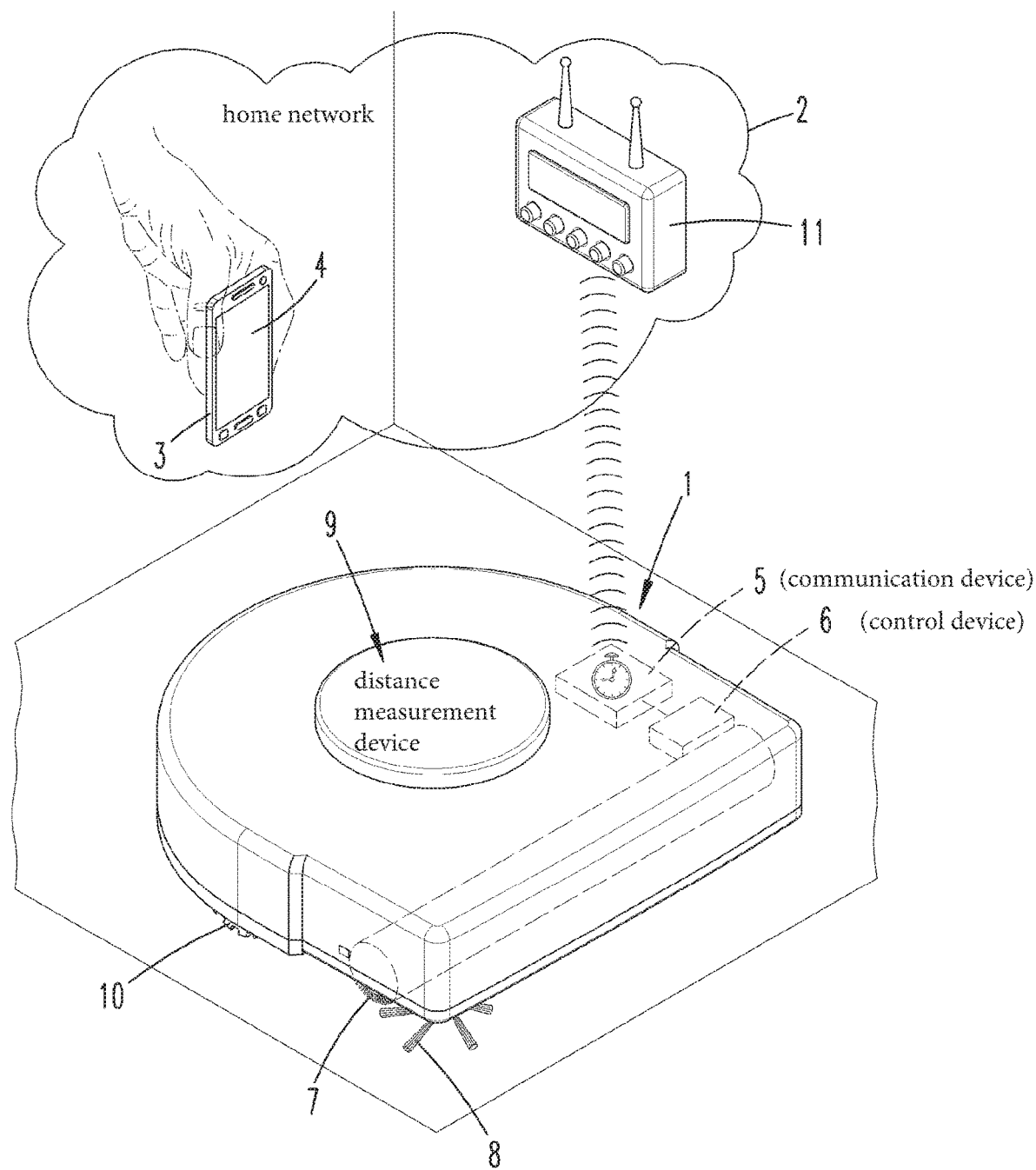

METHOD FOR CONNECTING A HOUSEHOLD APPLIANCE TO A WIRELESS HOME NETWORK

CROSS REFERENCE TO RELATED APPLICATIONS

Applicant claims priority under 35 U.S.C. § 119 of German Application No. 10 2017 119 589.0 filed Aug. 25, 2017, the disclosure of which is incorporated by reference.

BACKGROUND OF THE INVENTION

1. Field of the Invention

The invention relates to a method for connecting a household appliance to a wireless home network, wherein a user terminal connects to a temporary communication network of the household appliance and transmits network access information for the home network to the household appliance, wherein the temporary communication network is ended subsequently and the household appliance logs into the wireless home network by using the received network access information, wherein the user terminal obtains information from the household appliance about the fact that the log-in of the household appliance into the home network has failed.

The invention furthermore relates to a household appliance comprising a communication device for providing a temporary communication network and for receiving network access information for a home network about the temporary communication network, wherein the communication device is furthermore embodied to log the household appliance into the wireless home network by using the network access information after ending the temporary communication network.

2. Description of the Related Art

Methods of the above-mentioned type are known in the prior art. They serve in particular to connect a household appliance, which does not have its own manual input interface, to a home network. The household appliance can for example be an automatically moving household appliance, such a cleaning robot. To connect the household appliance to the home network, a user terminal transmits the network access information required for the log-in into the household appliance.

Patent specification EP 2 728 938 A2 discloses for example a method for connecting a device to a home network, which device does not provide its own interface, for example keypad, for the manual input of network access information. To obtain the network access information from a different device, the device to be connected realizes a temporary function as a switching device. It can thus receive a terminal identification for the home network via the temporary network. The appliance to be connected stores the terminal identification and connects to the home network by means of the terminal identification, while its function as alternative switching device in the temporary wireless network is ended.

While the appliance logs into the home network, errors can occur. For example, an access password to the home network can be incorrect or a server of the home network may temporarily not be available. If the appliance does not have its own display, only a limited error message can be output, for example by means of a blinking LED, in the event of a failed log-in.

SUMMARY OF THE INVENTION

Based on the above-mentioned prior art, it is thus the object of the invention to create an improved method for connecting a household appliance to a home network.

To solve the above-mentioned object, it is proposed that the household appliance opens a temporary communication network again if the log-in fails, wherein the user terminal recognizes the renewed opening of the temporary communication network and classifies it as information about the failure of the household appliance to log into the home network.

According to the invention, the user terminal now includes information about the fact that the household appliance was not able to log into the home network. Particularly advantageously, the user terminal is a mobile terminal of the user, such as for example a mobile telephone, a tablet computer or a laptop. These user terminals typically have extensive devices for inputting and displaying information. For example, the user terminal has a display, on which the failure of the log-in can be displayed to a user. It is possible thereby to display more extensive information about the failure, which goes beyond mere yes/no information. If the log-in fails, the household appliance opens a temporary communication network again, wherein the user terminal recognizes the renewed opening of the temporary communication network and classifies it as information about the failure of the household appliance to log into the home network. According to this embodiment, the household appliance does not actively transmit an error report or the like to the user terminal, the household appliance does not fact open a temporary communication network again, so that the user terminal can once again connect to the household appliance so as to transmit the network access information. The user terminal interprets the renewed opening of the temporary communication such that the integration of the household appliance in the home network has failed. However, a renewed connection of the user terminal to the temporary communication network does not inevitably take place at that point in time, in order to transmit for example error-related data. Only the renewed opening of a temporary communication network of the household appliance is not sufficient as information about the failure of the log-in. The user terminal can then use this information to report the failure to establish the connection to a user.

It is proposed that the household appliance determines a period of time, within which the log-in into the wireless home network needs to take place, wherein the log-in is considered as having failed after the period of time has elapsed without successful connection of the household appliance. After the temporary communication network is turned off or in particular after transmission of the network access information to the home network, a timer, which defines the period of time, can be started in the household appliance. The connection between the household appliance and the home network can materialize within this period of time, so that the log-in is not considered as having failed. If the log-in has not taken place upon the elapse of the period of time, a temporary communication network is turned on again. For this purpose, a control device of the household appliance monitors a communication device with regard to a data exchange between the communication device of the household appliance and the wireless home network, wherein a conclusion can be drawn for example by means of a defined response data set from a network server of the home network that it had been possible to properly log the household appliance into the home network. The period of time determined by the timer can be a few minutes, but advantageously less than 2 minutes or particularly preferably less than 1 minute. Provided that the household appliance does not receive a response from the server of the home network during this period of time, the control of the household appliance device classifies the log-in as being without success, i.e. as failed. As explained above, the household appliance then opens a temporary communication network again, which can be detected by the user terminal.

It is furthermore proposed that the user terminal determines a period of time, within which the user terminal monitors, whether the household appliance opens a temporary communication network again. According to this embodiment, the user terminal, in turn, monitors for a predetermined period of time, whether the household appliance activates a temporary communication network again. If the user terminal determines a temporary communication network of the household appliance within the period of time, the user terminal interprets this information in such a way that the integration of the household appliance in the home network has failed. Advantageously, the period of time predetermined by the user terminal is larger than the period of time used by the household appliance to monitor the proper log-in, because the temporary communication network has to first be opened by the household appliance after the failed log-in. The user terminal preferably determines a period of time of a few minutes, advantageously of for example up to 2 minutes.

It is furthermore proposed in this connection that the period of time, which is determined by the user terminal, starts after the transmission of the network access information to the household appliance and/or after the temporary communication network has ended. For example either the period of time, at which the user terminal has transmitted the network access information to the household appliance, or at which the household appliance ends the temporary communication network, can thus be selected as starting point for the timer of the user terminal. Both points in time can be determined via the data communication, which is output by the communication device, between the user terminal and the household appliance.

It can furthermore be provided that the user terminal transmits a message to a user in the event that the log-in of the household appliance has failed. If the user terminal is a mobile device of the user, the user can also receive the message, when he is not located in the vicinity of the household appliance. The message about the failure can be an acoustic, optical and/or haptic message, for example in the form of a text display, the output of an acoustic message as speech or sequence of sounds, or also a vibration of the user terminal. The message can be limited to the information about the failure of the connection establishment. In the alternative, however, it is also possible that further information, such as for example the point in time of the transmission of the network access information to the household appliance, or the point in time the temporary communication network is ended, are displayed.

According to a further embodiment of the method, it can be provided that the user terminal connects to the renewed temporary communication network of the household appliance and receives an error report about the failure of the log-in. According to this embodiment, the user terminal connects to the temporary communication network of the household appliance again, in order to receive error-related data. The error report can include for example information about the reason of the failure of the log-in, for example that the access password to the home network was incorrect or that the server of the home network could temporarily not be reached. According to this embodiment, detailed error information is read out from the household appliance, which can then be provided to a user.

It is in particular proposed that the user terminal receives the error report and displays an error information contained therein on a display in symbol form and/or in text form. The error report with the error information contained therein as well as additional information, if applicable, is thus optically or visually displayed, respectively. If for example the access password to the home network was incorrect, the information that the input is to be repeated can be transmitted to a user in addition to the mere error information. In the event that for example the server of the home network was temporarily inaccessible, the user could receive the information to wait several minutes and to then make the configuration again. The error report and/or individual pieces of error information therefrom and/or additional information can be displayed on the display of the user terminal in different ways. For example, the information can be displayed as plain text, i.e. in text form, or with symbols, which for example suggest different error sources, in particular a server, which cannot be reached, or an incorrect access password. It goes without saying that the information can also be displayed simultaneously in different ways, for example both in symbol form and in text form.

In addition to the above-described method for connecting a household appliance to a wireless home network, the invention furthermore also proposes a household appliance, in particular an automatically moving household appliance, wherein the household appliance has a communication device for providing a temporary communication network and for receiving network access information for a home network about the temporary communication network, wherein the communication device is furthermore embodied to log the household appliance into the wireless home network after ending the temporary communication network by using the network access information, wherein the household appliance furthermore has a control device, which is set up to monitor a log-in into the home network and to control the communication device to open a temporary communication network again, if a failure of the log-in is detected.

According to the invention, the household appliance is thus set up to carry out a method of the above-described type. The further features and advantageous result as explained above with reference to the different embodiments of the method according to the invention.

It can in particular be provided that the household appliance has a timer, which determines a period of time, within which the log-in into the wireless home network needs to take place, wherein the log-in is considered as having failed after the predetermined period of time has elapsed without a successful connection of the household appliance. The control device of the household appliance can furthermore be equipped to start the timer, when the temporary communication network was ended or when the network access information was transmitted to the home network.

BRIEF DESCRIPTION OF THE DRAWINGS

The invention will be described in more detail below by means of exemplary embodiments. In the drawings:

FIG. 1 shows a system of a household appliance, a user terminal, and a home network during the transmission of network access information from the user terminal to the household appliance, and FIG. 2 shows the system according to FIG. 1 during the log-in of the household appliance into the home network.

DETAILED DESCRIPTION OF PREFERRED EMBODIMENTS

FIG. 1 shows a home network 2, for example a common Wi-Fi network, comprising an access point 11. A household appliance 1 and a user terminal 3 are furthermore shown, which can be connected to the home network 2. Here, the household appliance 1 is an automatically moving cleaning appliance, namely a robot vacuum cleaner. The user terminal 3 is a smart phone. The household appliance 1, the user terminal 3, and the access point 11 have communication devices 5, namely here Wi-Fi radio modules.

The household appliance 1 has a navigation and self-location device, which is not illustrated in detail, by means of which the household appliance 1 can orientate itself and move within a surrounding area. The navigation and self-localization device evaluates measurement data from a distance measurement device 9, which is for example a rotary laser scanner in the manner of a laser triangulation measurement system here. Distances to obstacles and space demarcations within the surrounding area are measured by means of a distance measurement device 9. The measurement data is preferably compared to measurement data from an odometry sensor, which is assigned to wheels 10 of the household appliance 1, and which detects a distance covered by the household appliance 1. The information about obstacles and space demarcations of the surrounding area is further processed into a surrounding area map of the household appliance 1, with the help of which the household appliance 1 can orientate itself in the surrounding area.

The household appliance 1 furthermore has cleaning elements 7, 8 for treating a surface to be cleaned. Here, the cleaning element 7 is for example an electric motor-driven bristle roller, which rotates about a substantially horizontal axis. The cleaning element 8 is a side brush, which rotates about a substantially a vertical axis and which protrudes beyond a contour of the household appliance 1 and which is in particular suitable for cleaning at floor-wall transitions. The household appliance 1 furthermore includes the communication device 5 as well as a control device 6, which also controls the communication device 5, among others, and which receives data from the latter.

Here, the user terminal 3 is embodied as smart phone, but, in the alternative, can also be a different, preferably mobile terminal of the user, preferably from the group of laptop, tablet computer and the like. The user terminal 3 also has a communication device, which is not illustrated in detail, and also a control device. In addition, the user terminal 3 has a display 4. The user terminal 3 is typically connected to the home network 2.

FIG. 1 shows a transmission of network access information from the user terminal 3 to the household appliance 1. To be able to transmit the network access information, the communication device 5 of the household appliance 1 has opened a Wi-Fi hotspot as temporary communication network. The communication device of the user terminal 3, which is not illustrated in more detail, scans the surrounding area for available networks and provides them for example to an application, which is installed on the user terminal 3. The available networks can be displayed to a user on the display 4 of the user terminal 3, whereupon he can select a desired network, namely here the temporary communication network of the household appliance 1. A user then inputs network access information for the wireless home network 2 into the user terminal 3 via the display 4, which is preferably embodied as touch screen. The user terminal 3 then transmits the network access information to the household appliance 1 via the temporary communication network. The application, which is installed on the user terminal 3, can provide an input mask to the user on the display 4, into which the user can input a SSID of the household appliance 1, a corresponding password, and a name for the household appliance 1. The SSID of the household appliance 1 can be provided by the manufacturer, for example on an imprint or sticker on the housing of the household appliance 1. After a confirmation of the input made by the user and transmission to the household appliance 1, the temporary communication network is closed.

As illustrated in FIG. 2, the household appliance 1 then attempts to connect to the home network 2. The user terminal 3 is also connected to the home network 2 again after ending the temporary communication network. The communication device 5 of the household appliance 1 transmits the network access information to the access point 11 of the home network 2. With the transmission of the network access information, the control device 6 of the household appliance 1 starts a timer, which is set for example for a period of time of 1 minute. The control device 6 then monitors, whether the communication device 5 receives a response from the access point 11, which allows drawing the conclusion that the log-in of the household appliance 1 into the home network 2 has taken place successfully.

If no response is received from the access point 11 on the communication device 5 of the household appliance 1 within the period of time determined with the timer, the control device 6 classifies this as failure of the log-in. The control device 6 then prompts the communication device 5 to open a temporary communication network again. This repeated temporary communication network of the household appliance 1 can in turn be detected by the communication device of the user terminal 3. If the user terminal 3 detects a repeated opening of a temporary communication network, the application, which is installed on the user terminal 3, classifies this as information about a failure of the log-in of the household appliance 1 into the home network 2.

The application, which is installed on the user terminal 3, can, in turn, determine a period of time, within which a renewed opening of a temporary communication network by the household appliance 1 is monitored. This period of time can for example be started at the point in time of the transmission of the network access information from the user terminal 3 to the household appliance 1 and/or the point in time when the temporary communication network is ended. Within the defined period of time, the application of the user terminal 3 classifies the appearance of a temporary communication network of the household appliance 1 as information that the household appliance 1 had not been able to log into the home network 2. This information can then be displayed to a user on the display 4 of the user terminal 3.

To obtain further information about the failure of the log-in, in particular about the reason of the failure, the user terminal 3 according to a further developed embodiment (not illustrated) can log into the temporary communication network of the household appliance 1 again and can read or request, respectively, an error report from the household appliance. The user terminal 3 can evaluate the information contained in the error report and can display it at least partially on the display 4. An add-on, which informs the user about preferably further measures, for example a request to repeat the input of the network access information at the user terminal 3, or to wait several minutes, until the access point 11 of the home network 2 is available for a log-in of the household appliance 1 again, can thereby be included with the error information.

LIST OF REFERENCE NUMERALS 1 household appliance
2 home network
3 user terminal
4 display
5 communication device
6 control device
7 cleaning element
8 cleaning element
9 distance measurement device
10 wheel
11 access point

What is claimed is:

1. A method for connecting a household appliance to a wireless home network, comprising:
    opening a temporary communication network by the household appliance,
    whereby a communication device of the household appliance opens a Wi-Fi hotspot as the temporary communication network,
    scanning by a user terminal a surrounding area for available networks,
    displaying available networks to the user on a display of the user terminal,
    selecting the temporary communication network of the household appliance by the user,
    connecting the user terminal to the temporary communication network of the household appliance by logging the user terminal into the temporary communication network of the household appliance,
    transmitting network access information for logging the household appliance into the wireless home network by the user terminal to the household appliance over the temporary communication network,
    ending the temporary communication network;
    logging into the wireless home network by the household appliance using the received network access information,
    obtaining information from the household appliance by the user terminal when log-in of the household appliance into the wireless home network has failed, and
    opening the temporary communication network by the household appliance again after a failed log-in,
    wherein the user terminal recognizes a renewed opening of the temporary communication network and classifies the renewed opening as information about the failure of the household appliance to log into the home network.

2. The method according to claim 1, wherein the household appliance determines a period of time within which the log-in into the wireless home network needs to take place, wherein the log-in is considered as having failed after the period of time has elapsed without successful connection of the household appliance.

3. The method according to claim 2, wherein the period of time starts after transmission of the network access information to the household appliance.

4. The method according to claim 1, wherein the user terminal determines a period of time within which the user terminal monitors whether the household appliance opens a temporary communication network again.

5. The method according to claim 4, wherein the user terminal starts the period of time after the transmission of the network access information to the household appliance and/or after the temporary communication network has ended.

6. The method according to claim 1, further comprising the step of transmitting with the user terminal a message to a user in the event that the log-in of the household appliance has failed.

7. The method according to claim 1, further comprising the steps of connecting the user terminal to the renewed temporary communication network of the household appliance and receiving with the user terminal an error report about the failure of the log-in.

8. The method according to claim 7, wherein the user terminal receives the error report and displays an error information contained therein on a display in symbol form and/or in text form.

9. A household appliance comprising:
    a communication device configured for providing a temporary communication network and for receiving network access information for a wireless home network over the temporary communication network, wherein the communication device of the household appliance is configured to open a Wi-Fi hotspot as the temporary communication network,
    wherein the communication device is embodied to log the household appliance into the wireless home network after ending the temporary communication network by using the network access information, and
    a control device, which is set up to monitor a log-in into the home network by the household appliance and to control the communication device to open the temporary communication network again, if a failure of the log-in to the wireless home network by the household appliance is detected.

* * * * *